(12) United States Patent
Yu et al.

(10) Patent No.: US 10,254,950 B2
(45) Date of Patent: Apr. 9, 2019

(54) DISPLAY METHOD OF TERMINAL DEVICE AND TERMINAL DEVICE

(71) Applicant: HUAWEI TECHNOLOGIES CO., LTD., Shenzhen (CN)

(72) Inventors: Bo Yu, Shenzhen (CN); Jianbin Qiu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 15/314,260

(22) PCT Filed: May 30, 2014

(86) PCT No.: PCT/CN2014/078904
§ 371 (c)(1),
(2) Date: Nov. 28, 2016

(87) PCT Pub. No.: WO2015/180124
PCT Pub. Date: Dec. 3, 2015

(65) Prior Publication Data
US 2017/0199642 A1    Jul. 13, 2017

(51) Int. Cl.
*G06F 3/14*        (2006.01)
*G06F 3/0488*    (2013.01)
(Continued)

(52) U.S. Cl.
CPC .......... *G06F 3/0488* (2013.01); *G06F 3/0482* (2013.01); *G06F 3/04845* (2013.01);
(Continued)

(58) Field of Classification Search
CPC ..................................... G06F 3/14; G06F 3/17
(Continued)

(56) References Cited

U.S. PATENT DOCUMENTS

2008/0165210 A1    7/2008    Platzer et al.
2011/0109635 A1    5/2011    Platzer et al.
(Continued)

FOREIGN PATENT DOCUMENTS

CN    101980118 A    2/2011
CN    102279667 A    12/2011
(Continued)

OTHER PUBLICATIONS

International Search Report dated Feb. 27, 2015 in PCT/CN2014/078904 (with English Translation).
(Continued)

*Primary Examiner* — Ruay Ho
(74) *Attorney, Agent, or Firm* — Oblon, McClelland, Maier & Neustadt, L.L.P.

(57) ABSTRACT

A display method of a terminal device and a terminal device is provided. The display method of a terminal device includes: a framework layer sends a first touch point data; an application layer sends instruction information used to instruct to transfer slide drawing control rights to the framework layer and a generated display list to the framework layer after the application layer determines that the terminal device enters a sliding state according to acquired first touch point data; and the framework layer acquires second touch point data from a shared memory according to the instruction information, and draws an image according to the second touch point data and the display list. In this way, in an operation with repetitive image composition, the slide drawing control rights are transferred from an application module to a framework module, improving a response speed of a terminal system.

12 Claims, 5 Drawing Sheets

(51) Int. Cl.
*G06F 3/147* (2006.01)
*G06F 3/0484* (2013.01)
*G06F 3/0482* (2013.01)

(52) U.S. Cl.
CPC ...... *G06F 3/04847* (2013.01); *G06F 3/04883* (2013.01); *G06F 3/147* (2013.01); *G09G 2320/0252* (2013.01); *G09G 2330/021* (2013.01)

(58) Field of Classification Search
USPC .......... 715/754, 765; 345/156, 173; 375/240.16; 348/240.99
See application file for complete search history.

(56) References Cited

U.S. PATENT DOCUMENTS

| | | | |
|---|---|---|---|
| 2011/0221694 A1* | 9/2011 | Karaoguz | G06F 3/016 345/173 |
| 2013/0024778 A1 | 1/2013 | Reeves et al. | |
| 2014/0063021 A1 | 3/2014 | Platzer et al. | |
| 2014/0118246 A1* | 5/2014 | Park | G06F 3/017 345/156 |
| 2014/0211047 A1* | 7/2014 | Lee | H04N 5/23216 348/240.99 |
| 2015/0035838 A1 | 2/2015 | Platzer et al. | |
| 2015/0248167 A1* | 9/2015 | Turbell | G06F 3/017 715/754 |
| 2016/0077682 A1 | 3/2016 | Reeves et al. | |
| 2016/0379399 A1 | 12/2016 | Platzer et al. | |

FOREIGN PATENT DOCUMENTS

| | | |
|---|---|---|
| CN | 103176633 A | 6/2013 |
| CN | 103176738 A | 6/2013 |
| CN | 103488321 A | 1/2014 |
| EP | 2 631 788 A1 | 8/2013 |
| WO | WO 2012/151952 A1 | 11/2012 |
| WO | WO 2013/01044 A2 | 1/2013 |
| WO | 2014052934 A2 | 4/2014 |

OTHER PUBLICATIONS

Combined Office Action and Search Report dated Oct. 30, 2017 in Chinese Patent Application No. 201480014724.X (with English translation of categories of cited documents).

* cited by examiner

DISPLAY METHOD OF TERMINAL DEVICE AND TERMINAL DEVICE

CROSS-REFERENCE TO RELATED APPLICATIONS

This application is a national stage of International Application No. PCT/CN2014/078904, filed on May 30, 2014, which is hereby incorporated by reference in its entirety.

TECHNICAL FIELD

Embodiments of the present disclosure relate to the field of electronic technologies, and in particular, to a display method of a terminal device and a terminal device.

BACKGROUND

A native Android (Android) system includes a platformized hierarchical structure, and such a structure includes a hardware driver (kernel) layer, a framework (application framework) layer, an application (applications) layer, and the like. It may be understood that an advantage of hierarchy is that content provided by a lower layer is used to provide a unified service for an upper layer, a difference between a current layer and the lower layer is shielded, and the upper layer is not affected when the current layer and the lower layer change. That is, each layer performs their own functions, and each layer provides a fixed service access point (SAP). The hardware driver layer mainly connects to bottom-layer hardware and is used to report hardware feedback information to the framework layer, where the feedback information includes a touch position, a size of a touch area, and the like; the framework layer is used to receive the hardware feedback information reported by the hardware driver layer and process and encapsulate the hardware feedback information for invoking by the application layer. For example, the framework layer may determine, according to the received hardware feedback information, whether a user presses a home button, and reports the information to the application layer; the application layer performs corresponding processing according to the information reported by the framework layer, for example, performs an operation of opening a home page according to home button pressing information reported by the framework layer.

In the prior art, a touch-display event includes the following process: First, a touchscreen driver at the hardware driver layer is run to acquire a touch event, where the touch event includes a touch position, a touch time, and the like; then the hardware driver layer reports touch event information to the framework layer, and the framework layer processes and encapsulates the touch event information, including a location and a time of the touch event, a type (including a finger down point, a finger move point, and a finger up point) of the touch event, a sliding speed, an acceleration, and the like; afterward, the framework layer reports the processed information to the application layer, and then, the application layer performs image data processing according to the information, for example, performs an operation of displaying a new image. Specifically, image processing at the application layer includes image composition, image drawing, image layer composition, and the like. Finally, the application layer sends composed image data to a display driver at the hardware driver layer through the framework layer, and image displaying is completed on a display (for example, a liquid crystal display). This touch-display process involves layers of processing and is an extremely fixed manner.

However, according to an existing display process, when an operation of repetitive image composition is being processed, each touch action needs to be reported from the driver layer to the application layer in a layer-by-layer manner and sent back to the driver layer in the layer-by-layer manner after being processed at the application layer, to finally complete displaying. This process may result in a large quantity of redundant processing operations and consume a large quantity of system resources. The repetitive image composition mentioned herein refers to image composition in which most of multiple consecutive frames are repeatedly composed and only a small quantity of elements change.

SUMMARY

Embodiments of the present disclosure provide a display method of a terminal device and a terminal device to resolve a problem of excessive redundant operations resulting in a long system response time, low display efficiency, and large power consumption when an existing terminal device is used to process an operation with repetitive image composition in a touch-display procedure.

According to a first aspect, an embodiment of the present disclosure provides a display method of a terminal device, including:

sending, by a framework layer, first touch point data to an application layer; and after the application layer determines, according to the first touch point data, that the terminal device enters a sliding state, sending instruction information to the framework layer and sending a generated display list to the framework layer, where the instruction information includes information instructing to transfer slide drawing control rights to the framework layer, and the first touch point data includes second touch point data; and acquiring, by the framework layer, the second touch point data from a shared memory according to the instruction information, and drawing an image according to the second touch point data and the display list, where the second touch point data includes position coordinates and time information that are of a touch point.

With reference to the first aspect, in a first possible implementation manner of the first aspect, the method further includes:

predicting, by the framework layer, a next position of a user operation according to the second touch point data acquired from the shared memory, and drawing a predicted image according to data of the predicted position and the display list.

With reference to the first possible implementation manner of the first aspect, in a second possible implementation manner of the first aspect, the method further includes:

stopping displaying the predicted image if the framework layer learns, according to the second touch point data acquired from the shared memory, that the user operation is an emergency stop operation.

With reference to the first aspect, the first possible implementation manner of the first aspect, or the second possible implementation manner of the first aspect, in a third possible implementation manner of the first aspect, the method further includes:

sending, by a hardware driver layer, the second touch point data to the shared memory after acquiring the second touch point data.

With reference to the first aspect, the first possible implementation manner of the first aspect, or the second possible implementation manner of the first aspect, in a fourth possible implementation manner of the first aspect, the method further includes:

if a finger up state in the user operation is detected, sending, to the application layer by the framework layer, instruction information used to instruct to transfer the slide drawing control rights to the application layer.

According to a second aspect, an embodiment of the present disclosure provides a terminal device, including:

a sending module, configured to: send, by a framework layer, first touch point data to an application layer, and after the application layer determines, according to the first touch point data, that the terminal device enters a sliding state, send instruction information to the framework layer and send a generated display list to the framework layer, where the instruction information includes information instructing to transfer slide drawing control rights to the framework layer, and the first touch point data includes second touch point data; and a processing module, configured to: acquire, by the framework layer, the second touch point data from a shared memory according to the instruction information, and draw an image according to the second touch point data and the display list, where the second touch point data includes position coordinates and time information that are of a touch point.

With reference to the second aspect, in a first possible implementation manner of the second aspect, the processing module further includes a predicting unit, configured to: predict, by the framework layer, a next position of a user operation according to the touch point data acquired from the shared memory, and draw a predicted image according to data of the predicted position and the display list.

With reference to the first possible implementation manner of the second aspect, in a second possible implementation manner of the second aspect, the processing module further includes an emergency stop unit, configured to stop displaying the predicted image if the framework layer learns, according to the second touch point data acquired from the shared memory, that the user operation is an emergency stop operation.

With reference to the second aspect, the first possible implementation manner of the second aspect, or the second possible implementation manner of the second aspect, in a third possible implementation manner of the second aspect, the terminal device further includes an acquiring module, configured to send the second touch point data acquired by a hardware driver layer to the shared memory.

With reference to the second aspect, the first possible implementation manner of the second aspect, or the second possible implementation manner of the second aspect, in a fourth possible implementation manner of the second aspect, the processing module is further configured to:

if a finger up state in the user operation is detected, send, to the application layer by the framework layer, instruction information used to instruct to transfer the slide drawing control rights to the application layer.

According to the display method of a terminal device and the terminal device provided in the embodiments of the present disclosure, a framework layer sends touch point data; after determining, according to acquired first touch point data, that the terminal device enters a sliding state, the application layer sends, to the framework layer, instruction information used to instruct to transfer slide drawing control rights to the framework layer and sends a generated display list to the framework layer; the framework layer acquires second touch point data from a shared memory according to the instruction information, and draws an image according to the second touch point data and the display list. In this way, in an operation with repetitive image composition, the slide drawing control rights are transferred from the application layer to the framework layer, and the framework layer that is closer to bottom-layer hardware than the application layer draws the image (that is, drawing an image near a screen), thereby optimizing a display path of the terminal device, improving a response speed of a system of the terminal device, and reducing power consumption of the terminal device.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

A terminal device described in the embodiments of the present disclosure includes a terminal, a mobile phone, a tablet personal computer, a laptop computer, and the like.

Figure 1:
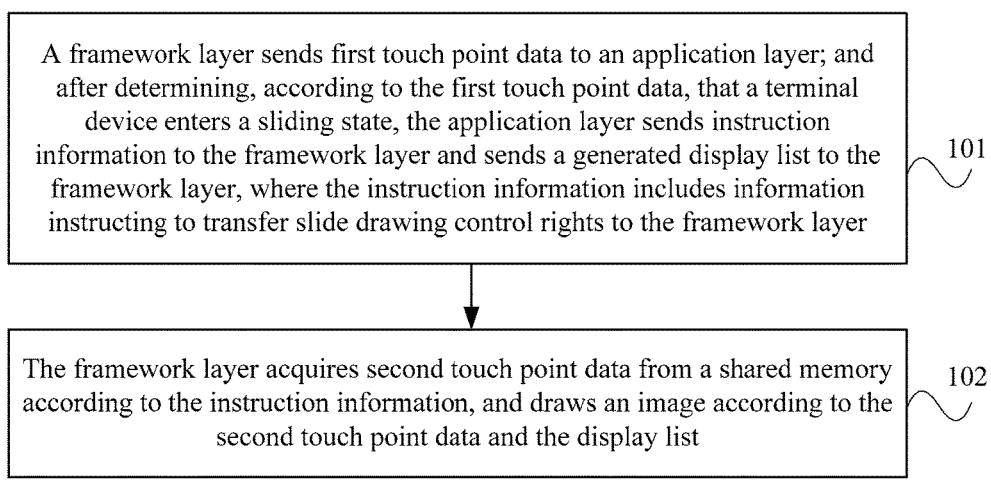
FIG. 1 is a flowchart of Embodiment 1 of a display method of a terminal device according to the present disclosure.

FIG. 1 is a flowchart of Embodiment 1 of a display method of a terminal device according to the present disclosure. As shown in FIG. 1, the method in this embodiment may include:

Step 101: A framework layer sends first touch point data to an application layer; and after determining, according to the first touch point data, that the terminal device enters a sliding state, the application layer sends instruction information to the framework layer and sends a generated display list to the framework layer, where the instruction information includes information instructing to transfer slide drawing control rights to the framework layer.

Touch point data sent by a hardware driver layer and received by the framework layer includes position coordinates, time information, and the like of a touch point, where the position coordinates may be a horizontal coordinate and a vertical coordinate of a position in which the touch point is located. After the framework layer receives the touch point data, a corresponding algorithm may be set at the framework layer of the terminal device for acquiring, according to the position coordinates and the time information that are of the touch point, a horizontal coordinate speed and a vertical coordinate speed of the touch point, an acceleration in a corresponding direction, whether the touch point is a finger down point (down), a finger move point (move), or a finger up point (up), or other information. The first touch point data is obtained after the foregoing processing, where the first touch point data includes the position coordinates and the time information that are of the touch point and further includes the horizontal and vertical coordinate speed of the touch point, the acceleration in the corresponding direction, touch point state information (the finger down point, the finger move point, or the finger up point), and other information that are acquired according to the corresponding algorithm that is set at the framework layer. The first touch point data is sent to the application layer, that is, touch point data sent by the framework layer to the application layer is the first touch point data obtained after the corresponding processing. Second touch point data is touch point data stored in a shared memory, and the second touch point data includes the position coordinates and the time information that are of the touch point. Therefore, the first touch point data includes the second touch point data, that is, the second touch point data is a subset of the first touch point data.

Determining, by the application layer according to the first touch point data sent by the framework layer, whether the terminal device enters the sliding state includes: learning, according to a preset rule model of touch point data and according to a regularity characteristic of touch point data and a corresponding mode of operating the terminal device by a user that are stored in the rule model, whether the terminal device enters the sliding state. Optionally, within a preset time (for example, 0.1 second or 0.05 second), if coordinates of multiple touch points shift within a preset range (for example, coordinates of a touch point shift from the bottom of a screen to the middle of the screen, or coordinates of a touch point shift from the left of the screen to the right of the screen), it is determined that the terminal device enters the sliding state. It may be understood that the terminal device enters the sliding state by means of a sliding gesture of pinch and stretch, horizontal, vertical, and oblique sliding gestures, and the like that are of the user. It may be understood that when obtaining data of a single touch point, the application layer may not consider that the terminal device enters the sliding state.

In the prior art, an application layer always draws an image according to touch point data and a display list, and sends the drawn image to a framework layer for display. Display processing is still performed according to the foregoing method even in repetitive image composition. Especially when a user operation is in a sliding state, a case of repetitive image composition is particularly common. For example, in left and right sliding operations on a desktop, content on left and right screens does not change in terms of image composition. In this embodiment, however, if the terminal device enters the sliding state, the instruction information and the generated display list are sent to the framework layer, where the instruction information is used to instruct to transfer the slide drawing control rights from the application layer to the framework layer, that is, the framework layer completes, according to the instruction information, image drawing after the terminal device enters the sliding state, and the display list includes content information of each component forming an image that is finally displayed on the terminal device. For example, left and right sliding is performed on a home screen of the terminal device, and the home screen includes multiple application icons and a home screen background image. Correspondingly, when acquiring touch point data corresponding to the left and right sliding, the application layer determines, according to the touch point data, that the terminal device is in the sliding state, and the application layer generates a display list and sends the display list to the framework layer, where the display list in this case includes the application icons and the home screen background.

Step 102: The framework layer acquires second touch point data from a shared memory according to the instruction information, and draws an image according to the second touch point data and the display list.

A hardware driver layer of an android system includes a shared memory driver, and the framework layer may obtain data in the shared memory by running the shared memory driver.

The framework layer acquires the second touch point data from the shared memory according to the instruction information, thereby implementing active acquiring of the touch point data for image drawing, to improve sensitivity of the terminal device. The shared memory stores data of multiple touch point corresponding to a user operation, for direct acquiring by the framework layer.

Optionally, the framework layer predicts a next position of the user operation according to the second touch point data acquired from the shared memory, and draws a predicted image according to data of the predicted position and the display list to improve a response speed of the terminal device. Predicting the next position of the user operation according to the acquired second touch point data may be specifically: first acquiring time of a former vertical synchronization signal (v-sync) on the terminal device, then calculating, according to current time, time when a next vertical synchronization signal arrives, and predicting the next position of the user operation according to the position information, the time information, and the like in the second touch point data.

Optionally, when the framework layer draws the predicted image according to the data of the predicted position and the display list, the framework layer determines, according to the second touch point data acquired from the shared memory, whether the user operation is an emergency stop operation, where the emergency stop operation means that the user stops a sliding operation on the terminal device but a finger does not leave a touchscreen of the terminal device, that is, the terminal device can still detect touch point data in this case. A corresponding algorithm may be set on the terminal device to determine, according to the touch point data, whether the user operation is the emergency stop operation. If the framework layer learns, according to the second touch point data acquired from the shared memory, that the user operation is the emergency stop operation, display of the predicted image is stopped to prevent the predicted image from going beyond an actual user operation.

In the foregoing steps, the application layer may acquire the first touch point data corresponding to the user operation and perform sliding state determining according to the acquired first touch point data, and the framework layer draws the image according to the information instructing to transfer the slide drawing control rights and according to the display list and the second touch point data acquired from the shared memory. Specific implementation processes of acquiring, by the application layer, the first touch point data and acquiring, by the framework layer, the second touch point data are as follows: After acquiring touch point data corresponding to the user operation, the hardware driver layer of the terminal device sends the touch point data to the application layer through the framework layer, and further stores the touch point data in the shared memory so that the framework layer directly acquires the touch point data, that is, the first touch point data is touch point data obtained after the framework layer processes the touch point data acquired from the hardware driver layer, and the second touch point data includes the touch point data acquired by the hardware driver layer and touch point data that is obtained by directly storing the touch point data acquired by the hardware driver layer to the shared memory.

Further, when the user stops the sliding operation and the terminal device does not display repetitive image composition, that is, when the terminal device needs a new display list, the framework layer acquires the second touch point data from the shared memory, and detects a state of the user operation according to the second touch point data. If a finger up state in the user operation is detected, the framework layer sends, to the application layer, instruction information used to instruct to transfer the slide drawing control rights to the application layer, thereby restoring a display procedure in the prior art. Optionally, a corresponding algorithm is set according to information that an area of the touch point decreases, a position of the touch point approximates to an edge, and the like, for determining whether the user operation is in the finger up state.

In this embodiment, after determining, according to acquired first touch point data, that a terminal device enters a sliding state, an application layer sends, to a framework layer, instruction information used to instruct to transfer slide drawing control rights to the framework layer, and sends a generated display list to the framework layer. The framework layer acquires second touch point data from a shared memory according to the instruction information, and draws an image according to the second touch point data and the display list. In this way, in an operation with repetitive image composition, the slide drawing control rights are transferred from the application layer to the framework layer, and the framework layer that is closer to bottom-layer hardware than the application layer draws the image (that is, drawing an image near a screen), thereby optimizing a display path of the terminal device, improving a response speed of a system of the terminal device, and reducing power consumption of the terminal device.

The following describes, in detail by using two specific embodiments, the technical solution in the method embodiment shown in FIG. 1.

Figure 2:
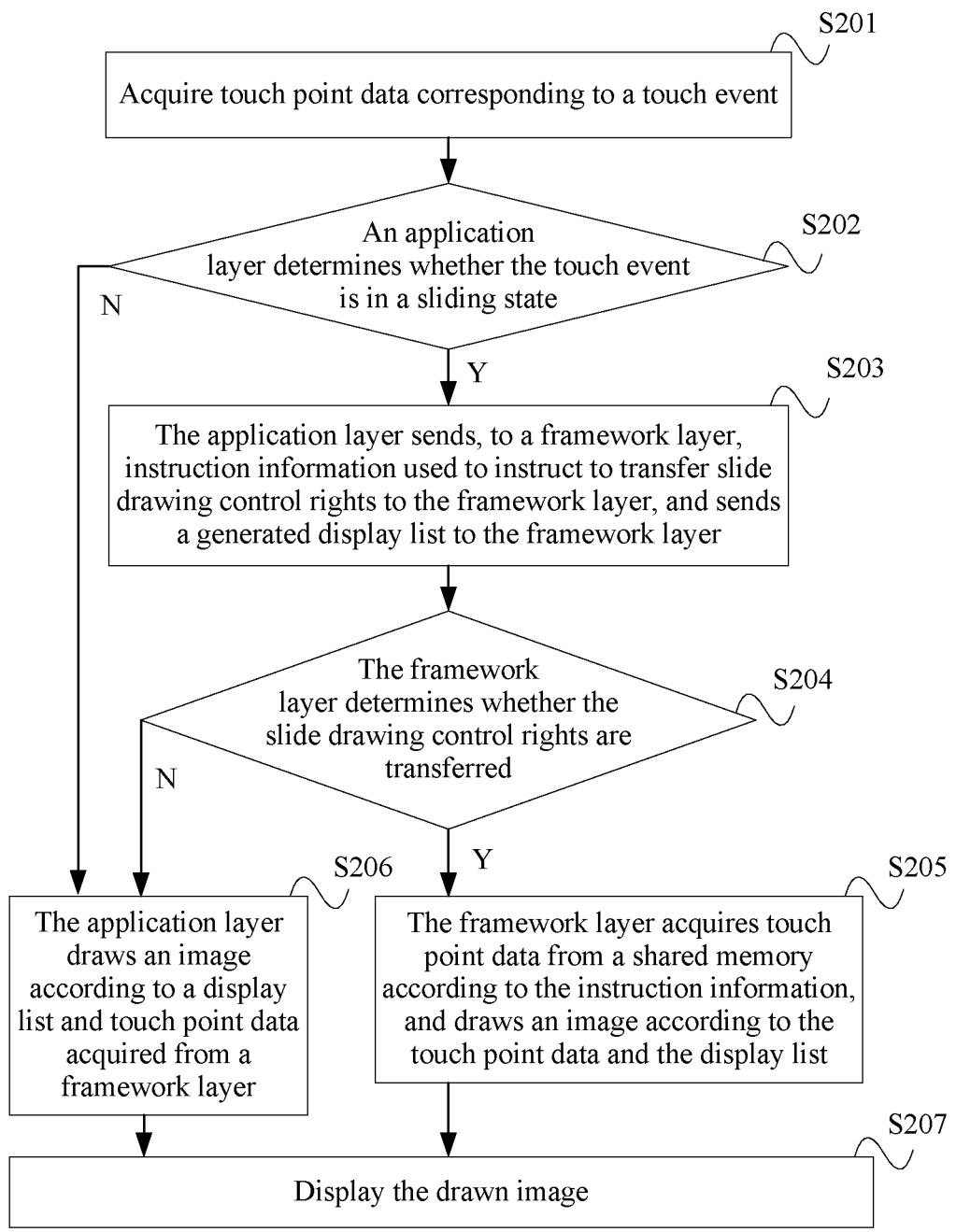
FIG. 2 is a flowchart of Embodiment 2 of a display method of a terminal device according to the present disclosure.

FIG. 2 is a flowchart of Embodiment 2 of a display method of a terminal device according to the present disclosure. As shown in FIG. 2, the method in this embodiment may include:

S201. Acquire touch point data corresponding to a touch event.

An input apparatus, such as a touchscreen, of a terminal device detects the touch event of a user, a hardware driver layer runs a touchscreen driver to transform the touch event into machine-readable touch point data and sends the touch point data to an application layer through a framework layer and to a shared memory. The shared memory saves the touch point data.

S202. An application layer determines whether the touch event is in a sliding state; and if the touch event is in the sliding state, perform S203, or if the touch event is not in the sliding state, perform S206.

Specifically, the application layer determines, according to acquired touch point data corresponding to a user operation, whether the terminal device enters the sliding state.

S203. The application layer sends, to a framework layer, instruction information used to instruct to transfer slide drawing control rights to the framework layer, and sends a generated display list to the framework layer.

Optionally, step S204 is further included, where in step S2014, the framework layer determines whether the slide drawing control rights are transferred; and if the sliding drawing control rights are transferred, perform S205, or if the sliding drawing control rights are not transferred, perform S206.

Specifically, the framework layer receives the instruction information used to instruct to transfer the slide drawing control rights to the framework layer and sent by the application layer, and the display list generated by the application layer. The framework layer performs scenario identification according to the foregoing information to identify whether the slide drawing control rights are transferred, that is, determine whether the application layer learns, by means of determining and according to the acquired touch point data corresponding to the user operation, that the terminal device enters the sliding state; if the application layer learns that the terminal device enters the sliding state, the application layer is used to draw an image, or if the application layer learns that the terminal device does not enter the sliding state, processing is performed according to a normal image drawing procedure in the prior art.

S205: The framework layer acquires touch point data from a shared memory according to the instruction information, and draws an image according to the touch point data and the display list.

Specifically, when the terminal device enters the sliding state and the application layer transfers the slide drawing control rights to the framework layer, the drawn image does not need to be displayed after the hardware driver layer sends the touch point data to the application layer through the framework layer and then the application layer draws the image and sends the image to the framework layer; instead, the framework layer directly acquires the touch point data from the shared memory, and the framework layer draws the image according to the touch point data and the display list.

S206. The application layer draws an image according to a display list and touch point data acquired from a framework layer.

S207. Display the drawn image.

A display driver is run to transform a drawn predicted image into the drawn image and display the drawn image on a display.

In this embodiment, a hardware driver layer of a terminal device acquires touch point data corresponding to a user operation. An application layer determines, according to the touch point data, whether the terminal device enters a sliding state, and if the terminal device enters the sliding state, sends, to a framework layer, instruction information used to instruct to transfer slide drawing control rights to the framework layer and a display list generated by the application layer. After receiving the foregoing information, the framework layer further determines whether the slide drawing control rights are transferred; if the sliding drawing control rights are transferred, the framework layer directly acquires touch point data from a shared memory, draws an image according to the touch point data and the display list, and the image is displayed. In this way, in an operation with repetitive image composition, the slide drawing control rights are transferred from the application layer to the framework layer, and the framework layer draws the image, thereby optimizing a display path of the terminal device, improving a response speed of a system of the terminal device, and reducing power consumption of the terminal device.

Figure 3:
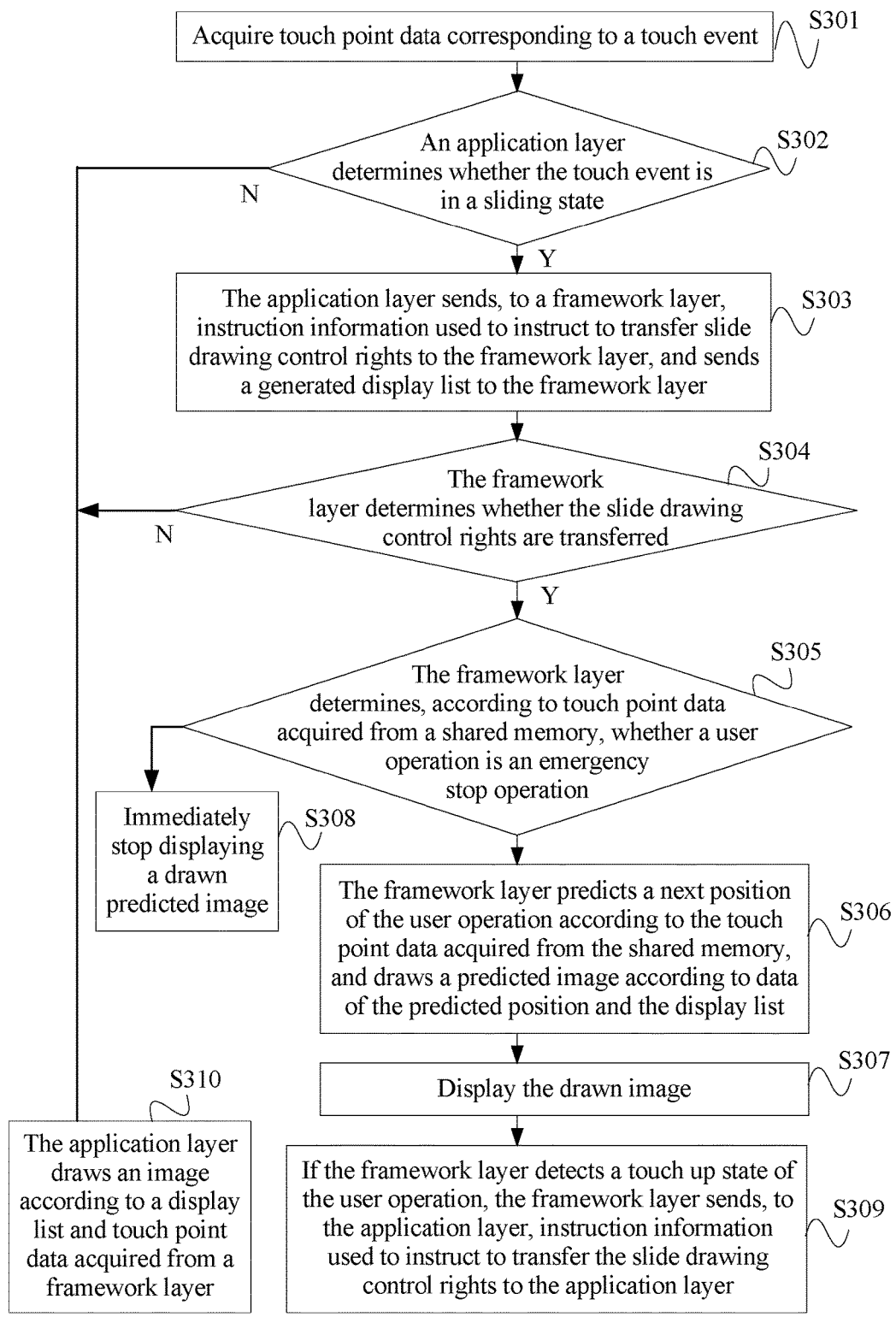
FIG. 3 is a flowchart of Embodiment 3 of a display method of a terminal device according to the present disclosure.

FIG. 3 is a flowchart of Embodiment 3 of a display method of a terminal device according to the present disclosure. As shown in FIG. 3, a difference between this embodiment and the embodiment shown in FIG. 2 lies in that a framework layer draws a predicted image according to touch point data and a display list. The method in this embodiment may include:

S301. Acquire touch point data corresponding to a touch event.

S302. An application layer determines whether the touch event is in a sliding state; and if the touch event is in the sliding state, perform S303, or if the touch event is not in the sliding state, perform S310.

S303. The application layer sends, to a framework layer, instruction information used to instruct to transfer slide drawing control rights to the framework layer, and sends a generated display list to the framework layer.

Optionally, S304 is included, where in S304, the framework layer determines whether the slide drawing control rights are transferred; and if the sliding drawing control rights are transferred, perform S405, or if the sliding drawing control rights are not transferred, perform S310.

S305. The framework layer determines, according to touch point data acquired from a shared memory, whether a user operation is an emergency stop operation; and if the user operation is not the emergency stop operation, perform S306, or if the user operation is the emergency stop operation, perform S308.

Whether the user operation is the emergency stop operation is learned by means of determining according to the touch point data and a preset rule model of touch point data. The rule model of touch point data stores a characteristic of the touch point data and a user operation corresponding to the touch point data.

S306. The framework layer predicts a next position of the user operation according to the touch point data acquired from the shared memory, and draws a predicted image according to data of the predicted position and the display list.

The next position of the user operation is predicted by using the acquired touch point data and according to a predictive algorithm, and the predicted image is drawn, thereby improving a response speed and sensitivity of the terminal device.

S307. Display the drawn image.

A display driver is run to transform the drawn predicted image into the drawn image and display the drawn image on a display.

S308. Immediately stop displaying a drawn predicted image.

When it is determined that the user operation is the emergency stop operation, the predicted image to be displayed on the terminal device is stopped immediately to prevent the predicted image from going beyond an actual user operation.

S309. If the framework layer detects a finger up state of the user operation, the framework layer sends, to the application layer, instruction information used to instruct to transfer the slide drawing control rights to the application layer.

That is, when the framework layer identifies the finger up state of the user operation, the application layer controls an inertial movement process after touching up and draws an image by using a normal procedure.

S310. The application layer draws an image according to a display list and touch point data acquired from a framework layer.

A specific implementation process of S301 to S304 is the same as S201 to S204 in Embodiment 2, and details are not described herein again.

In this embodiment, based on Embodiment 2, when a framework layer learns, by means of determining, that slide drawing control rights are transferred downwards, the framework layer predicts a next position of a user operation according to touch point data acquired from a shared memory, and draws a predicted image according to data of the predicated position and a display list. A display layer of a terminal device displays the drawn predicted image. In this way, when the user operation arrives at the next position, an image corresponding to the user operation can be displayed directly, thereby improving a response speed and sensitivity of the terminal device. When the framework layer determines, according to the touch point data acquired from the shared memory, that the user operation is an emergency stop operation, display of the predicted image is immediately stopped to prevent the predicted image from going beyond an actual user operation and resolve a sensitivity problem of a sliding effect in an operating system of the terminal device.

Figure 4:
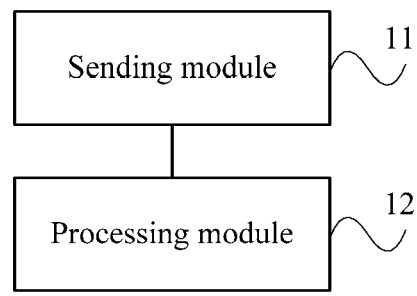
FIG. 4 is a schematic structural diagram of Embodiment 1 of a terminal device according to the present disclosure.

FIG. 4 is a schematic structural diagram of Embodiment 1 of a terminal device according to the present disclosure. As shown in FIG. 4, the apparatus in this embodiment may include: a sending module 11 and a processing module 12, where the sending module 11 is configured to: send first touch point data from a framework layer to an application layer; and after the application layer determines, according to the first touch point data, that the terminal device enters a sliding state, send instruction information to the framework layer and send a generated display list to the framework layer, where the instruction information includes information instructing to transfer slide drawing control rights to the framework layer, and the first touch point data includes second touch point data; the processing module 12 is configured to: acquire, by the framework layer, the second touch point data from a shared memory according to the instruction information, and draw an image according to the second touch point data and the display list, where the first touch point data includes position coordinates and time information that are of a touch point.

The apparatus in this embodiment may be used to perform the technical solution in the method embodiment shown in FIG. 1, and implementation principles and technical effects of the apparatus are similar to those of the method and are not described herein again.

Figure 5:
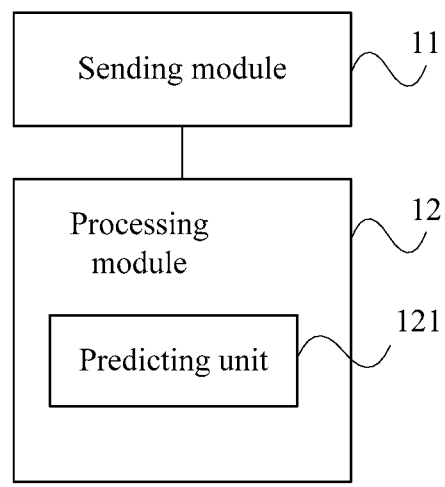
FIG. 5 is a schematic structural diagram of Embodiment 2 of a terminal device according to the present disclosure.

FIG. 5 is a schematic structural diagram of Embodiment 2 of a terminal device according to the present disclosure. As shown in FIG. 5, the apparatus in this embodiment is based on a structure of the apparatus shown in FIG. 4. Further, the processing module 12 may include a predicting unit 121, configured to predict, by the framework layer, a next position of a user operation according to the touch point data acquired from the shared memory, and draw a predicted image according to data of the predicted position and the display list.

The apparatus in this embodiment may be used to perform the technical solution in the method embodiment shown in FIG. 1, and implementation principles and technical effects of the apparatus are similar to those of the method and are not described herein again.

Figure 6:
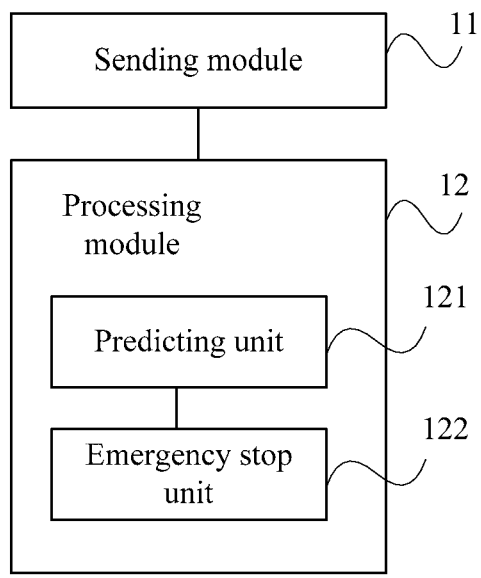
FIG. 6 is a schematic structural diagram of Embodiment 3 of a terminal device according to the present disclosure.

FIG. 6 is a schematic structural diagram of Embodiment 3 of a terminal device according to the present disclosure. As shown in FIG. 6, the apparatus in this embodiment is based on a structure of the apparatus shown in FIG. 5. Further, the processing module 12 may include an emergency stop unit 122, configured to stop displaying the predicted image if the framework layer learns, according to the second touch point data acquired from the shared memory, that the user operation is an emergency stop operation.

The apparatus in this embodiment may be used to perform the technical solution in the method embodiment shown in FIG. 1, and implementation principles and technical effects of the apparatus are similar to those of the method and are not described herein again.

Figure 7:
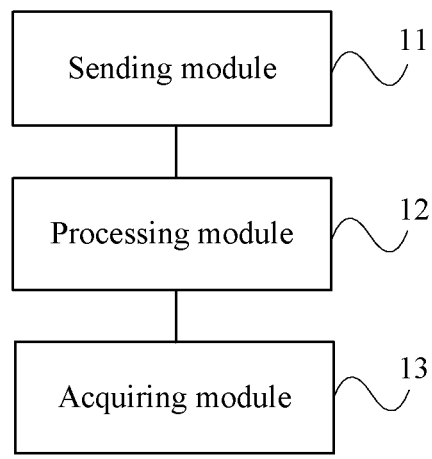
FIG. 7 is a schematic structural diagram of Embodiment 4 of a terminal device according to the present disclosure.

FIG. 7 is a schematic structural diagram of Embodiment 4 of a terminal device according to the present disclosure. As shown in FIG. 7, the apparatus in this embodiment is based on structures of the apparatuses shown in FIG. 4, FIG. 5, and FIG. 6. The foregoing terminal device may further include an acquiring module 13 shown in FIG. 7, configured to send the second touch point data acquired by a hardware driver layer to the shared memory.

The apparatus in this embodiment may be used to perform the technical solution in the method embodiment shown in FIG. 1, and implementation principles and technical effects of the apparatus are similar to those of the method and are not described herein again.

Based on the embodiments shown in FIG. 4 to FIG. 7, the processing module 12 is further configured to: if a finger up state in the user operation is detected, send, to the application layer by the framework layer, instruction information used to instruct to transfer the slide drawing control rights to the application layer.

The apparatus in this embodiment may be used to perform the technical solution in the method embodiment shown in FIG. 1, and implementation principles and technical effects of the apparatus are similar to those of the method and are not described herein again.

In the several embodiments provided in the present disclosure, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing apparatus, reference may be made to a corresponding process in the foregoing method embodiments, and details are not described herein again.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method used in a terminal device for image display, comprising:
   sending, by a framework layer in an operating system that is executed by a processor of the terminal device, touch point information corresponding to a user operation to an application layer in the operating system that is executed by the processor of the terminal device, the touch point information including coordinates of a touch point and time information of the touch point; and
   after determining, by the application layer according to the touch point information, that the terminal device enters a sliding state,
      sending, by the application layer, instruction information and a generated display list to the framework layer, wherein the instruction information instructs to transfer slide drawing control rights to the framework layer,
      acquiring, by the framework layer, the coordinates of the touch point from a shared memory according to the instruction information, generating, by the framework layer, an image according to the coordinates of the touch point and the display list, and after detecting a finger up state in the user operation, sending, to the application layer by the framework layer, another instruction information to transfer the slide drawing control rights to the application layer.

2. The method according to claim 1, wherein the method further comprises:

predicting, by the framework layer, a next position of the user operation according to the coordinates of the touch point acquired from the shared memory; and generating a predicted image according to the predicted next position and the display list.

3. The method according to claim 2, wherein the method further comprises:

stopping to display the predicted image when the framework layer determines, according to the coordinates of the touch point acquired from the shared memory, that the user operation is an emergency stop operation.

4. The method according to claim 1, wherein the method further comprises:

sending, by a hardware driver layer in the operating system that is executed by the processor of the terminal device, the coordinates of the touch point to the shared memory after acquiring the coordinates of the touch point from a touchscreen of the terminal device.

5. A terminal device, comprising:

a machine-readable storage medium storing software instructions of an operating system having a layer hierarchy; and a processor configured to execute the software instructions to:

send, by a framework layer in the layer hierarchy, touch point information corresponding to a user operation to an application layer in the layer hierarchy, the touch point information including coordinates of a touch point and time information of the touch point;

after determining, by the application layer according to the touch point information, that the terminal device enters a sliding state, send instruction information and a generated display list to the framework layer, wherein the instruction information comprises information to instruct transferring slide drawing control rights to the framework layer, acquire, by the framework layer, the coordinates of the touch point from a shared memory according to the instruction information, generate, by the framework layer, an image according to the coordinates of the touch point and the display list, and after detecting a finger up state in the user operation, send, to the application layer by the framework layer, another instruction information to transfer the slide drawing control rights to the application layer.

6. The terminal device according to claim 5, wherein the processor is configured to execute the software instructions to:

predict, by the framework layer, a next position of the user operation according to the coordinates of the touch point acquired from the shared memory; and generate a predicted image according to the predicted next position and the display list.

7. The terminal device according to claim 6, wherein the processor is configured to execute the software instructions to:

stop to display the predicted image when the framework layer determines, according to the coordinates of the touch point acquired from the shared memory, that the user operation is an emergency stop operation.

8. The terminal device according to claim 5, wherein the processor is configured to execute the software instructions to:

send, by a hardware driver layer in the layer hierarchy, the coordinates of the touch point to the shared memory after acquiring the coordinates of the touch point from a touchscreen of the terminal device.

9. A non-transitory computer readable medium storing program instructions of an operating system for causing a processor in a terminal device to execute operations for image display, the operations comprising:

sending, by a framework layer in the operating system, touch point information corresponding to a user operation to an application layer in the operating system, the touch point information including coordinates of a touch point and time information of the touch point; and after determining, by the application layer according to the touch point information, that the terminal device enters a sliding state, sending, by the application layer, instruction information and a generated display list to the framework layer, wherein the instruction information instructs to transfer slide drawing control rights to the framework layer, acquiring, by the framework layer, the coordinates of the touch point from a shared memory according to the instruction information, generating, by the framework layer, an image according to the coordinates of the touch point and the display list, and after detecting a finger up state in the user operation, sending, to the application layer by the framework layer, another instruction information to transfer the slide drawing control rights to the application layer.

10. The non-transitory computer readable medium according to claim 9, wherein the operations further comprise:

predicting, by the framework layer, a next position of the user operation according to the coordinates of the touch point acquired from the shared memory; and generating a predicted image according to the predicted next position and the display list.

11. The non-transitory computer readable medium according to claim 10, wherein the operations further comprise:

stopping to display the predicted image when the framework layer determines, according to the coordinates of the touch point acquired from the shared memory, that the user operation is an emergency stop operation.

12. The non-transitory computer readable medium according to claim 9, wherein the operations further comprise:

sending, by a hardware driver layer in the operating system, the coordinates of the touch point to the shared memory after acquiring the coordinates of the touch point from a touchscreen of the terminal device.

* * * * *